(No Model.)

E. HOUCK, A. M. GREENLEE, & A. S. HOUCK.
CHECK ROW PLANTER.

No. 273,534. Patented Mar. 6, 1883.

Attest:
J. W. Fowler
H. B. Applewhait

Inventors
Aaron S. Houck
Edwin Houck
Andrew M. Greenlee
by A. H. Evans & Co.
attys

UNITED STATES PATENT OFFICE.

EDWIN HOUCK, ANDREW M. GREENLEE, AND AUSTIN S. HOUCK, OF BEDFORD, IOWA.

CHECK-ROW PLANTER.

SPECIFICATION forming part of Letters Patent No. 273,534, dated March 6, 1883.

Application filed October 25, 1882. (No model.)

*To all whom it may concern:*

Be it known that we, EDWIN HOUCK, ANDREW M. GREENLEE, and AUSTIN S. HOUCK, of Bedford, in the county of Taylor and State of Iowa, have invented certain Improvements in Check-Row Planters; and we hereby declare the following to be a full, clear, and exact description thereof, reference being had to the accompanying drawings, making part of this specification, in which—

Figure 1:
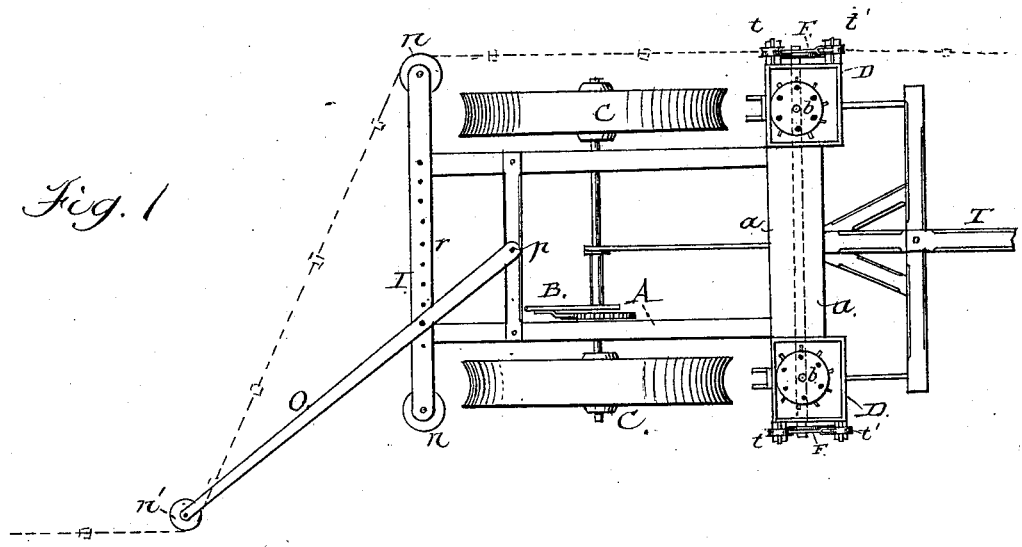
Figure 2:
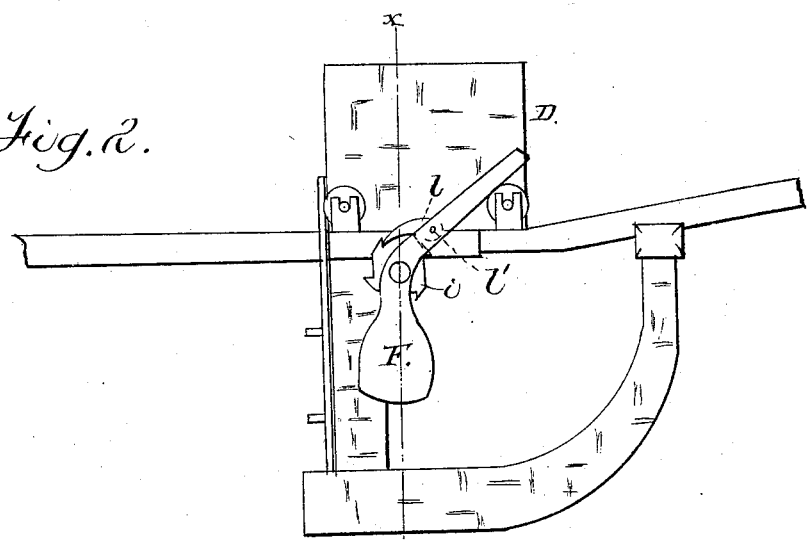
Figure 3:
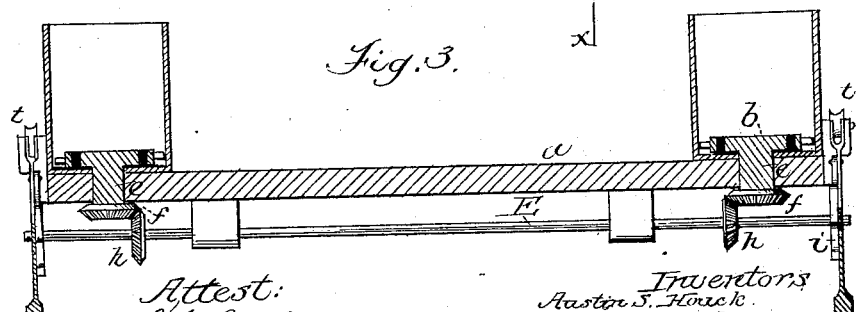

Figure 1 is a plan view of the planter with the check-rower applied. Fig. 2 is a side elevation of the seed-boxes and planting devices. Fig. 3 is a vertical section through the line $x\ x$ of Fig. 2.

Our invention relates to check-row planters, and is in the nature of an improvement on the patent issued to us September 19, 1882, and numbered 264,699; and our invention consists in sundry details of construction and combinations of devices, as hereinafter fully described, and specifically pointed out in the claims.

In order that those skilled in the art may make and use our invention, we will proceed to describe the manner in which we have carried it out.

In the said drawings, A is the frame carrying the adjusting-lever B, and mounted on wheels C C. The planter-shoes are fixed to a forward frame, to which is attached the tongue T, and which supports the seed-boxes D D by means of the cross-bar $a$. In the bottom of the boxes D are located the perforated feed-wheels $b\ b$, each of which is fixed to a short shaft, $e$, on the lower end of which is a beveled gear-wheel, $f$.

Secured in proper journal-boxes beneath cross-bar $a$ is a shaft, E, which passes beneath the seed-boxes and bears two beveled gears, $h\ h$, so located as to engage with beveled gears $f\ f$. At each end of the shaft is keyed, just outside the frame and against it, a ratchet, $i$, which is made to turn shaft E by means of a pawl, $l$, pivoted at $l'$ to a weighted lever, F, which is loosely journaled on the end of the shaft, and has its upper end bifurcated to engage with the check-row buttons, and the portion below the pivotal point on the shaft is weighted to draw pawl $l$ back over a new tooth as soon as the button has slipped out of the bifurcated end of the lever.

On the rear of frame A is a cross-bar, I, projecting somewhat beyond the line of the supporting-wheels, and bearing on each end pulley-guides $n\ n$ for the check-row wire or cord, and projecting rearwardly from the same frame is a pivoted guide-bar, O, bearing on its end a guide-pulley, $n'$, on which runs the check-row wire or cord, as shown. The bar O is pivoted at $p$ to a cross-bar in the frame, and by means of a pin or other desirable device it may be shifted and secured at will in holes $r\ r$ in cross-bar I, so as to stand alternately in opposite angles to the line of draft.

On projections from the forward frame-work, in front and rear of each pawl and lever, are guide-pulleys $t\ t'$ for the check-row wire or cord.

In the herein-described check-row planters we have simplified the construction, as well as insured greater wear in the working parts.

The operation of the teeth on the sprocket-wheel to drop the grain into the heel of the runner is substantially the same as shown in our former patent, hereinbefore cited.

Having thus described our invention, what we claim as new, and desire to secure by Letters Patent, is—

1. The intermittently-moved feed plates or wheels $b\ b$, bearing the beveled gears $f\ f$, in combination with shaft E, bearing beveled gears $h\ h$, meshing with gears $f\ f$, ratchets $i\ i$, securely mounted on the shaft E, and weighted bifurcated levers F, bearing pawls $l$, to engage ratchets $i\ i$, all constructed, arranged, and operated as set forth.

2. In combination with a check-row planter, the pivoted adjustable shifting guide-bar O, provided with a guide-pulley, $n'$, and means for securing said guide-bar in any position to which it may be adjusted, for the purpose described.

EDWIN HOUCK.
ANDREW M. GREENLEE.
A. S. HOUCK.

Witnesses:
R. K. EVANS,
E. J. REDMOND.